United States Patent Office 3,542,846
Patented Nov. 24, 1970

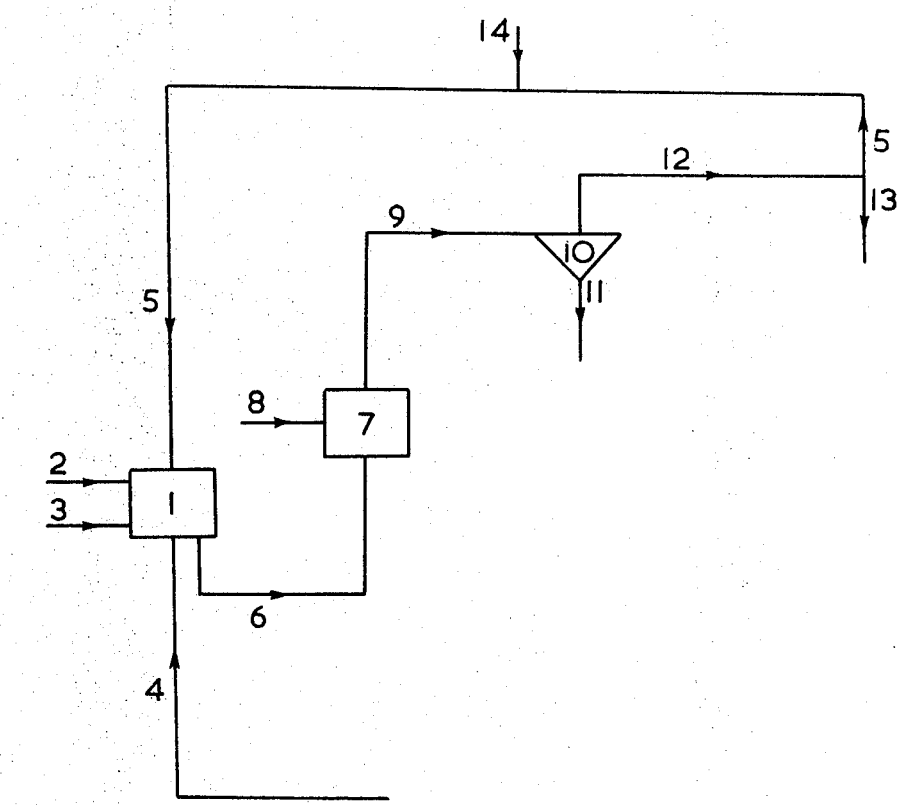

3,542,846
AMALGAM PROCESS FOR PREPARING ADIPONITRILE FROM ACRYLONITRILE
Donald Herbert Bartholomew, Runcorn, England, assignor to Imperial Chemical Industries Limited, Millbank, London, England, a corporation of Great Britain
Filed Feb. 19, 1968, Ser. No. 706,402
Claims priority, application Great Britain, Feb. 27, 1967, 9,138/67
Int. Cl. C07c 121/20, 121/26
U.S. Cl. 260—465.8
7 Claims

ABSTRACT OF THE DISCLOSURE

In a process in which alpha-beta-mono-olefinic nitriles or carboxylates are converted to their hydrodimers in a continuous manner by reaction with an alkali or alkaline earth metal amalgam and a proton source in a major proportion of polar organic solvent at a pH of 7 to 11.5 maintained by addition of an acidic buffering agent, improved operation is achieved by maintaining a suspension of the metal salt (formed from the acidic buffering agent and the metal of the amalgam) in the reaction mixture in the reaction zone, and by recycling a part of the said suspension to the reaction zone.

---

This invention relates to a process for the hydrodimerisation of alpha-beta-mono-olefinic nitriles or carboxylates.

In U.S. application Ser. No. 579,885, filed Sept. 16, 1966 there is described a hydrodimerisation process wherein an amalgam is interacted with a non-amalgam phase comprising the alpha-beta-mono-olefinic starting material, a proton source and a polar organic solvent. The apparent pH of the non-amalgam phase is preferably maintained in the range 7 to 11.5 by addition of an acidic buffering agent; an especially preferred buffering agent is carbon dioxide.

The use of an acidic buffering agent leads to the formation of a salt or salts of the metal component of the amalgam and these salts must subsequently be separated from the other components of the reaction mixture; thus when the amalgam is sodium amalgam and carbon dioxide is employed as buffering agent the predominant salt formed is sodium bicarbonate.

We have now found that the hydrodimerisation of alpha-beta-mono-olefinic nitriles or carboxylates may advantageously be operated by maintaining within the reaction zone a suspension of the metal salt (formed from an acidic buffering agent and metal of the amalgam) and recycling a portion of the non-amalgam phase containing the metal salt in suspension. The process to be described herein not only allows flexibility of control of the conditions in the reaction zone but also allows a relatively high concentration of the metal salt to be achieved in a portion withdrawn for subsequent separation of the said salt from the hydrodimer product, thereby avoiding the necessity of an inconvenient and expensive concentration stage.

Thus according to the present invention there is provided a continuous process for the production of a hydrodimer of an alpha-beta-mono-olefinic nitrile or carboxylate wherein an alkali or alkaline-earth metal amalgam is interacted with a non-amalgam phase comprising the said nitrile or carboxylate, a proton source and a major proportion by weight of polar organic solvent, the apparent pH being maintained in the range 7 to 11.5 by addition of an acidic buffering agent, a suspension of the alkali or alkaline-earth metal salt (formed from the acidic buffering agent and the metal of the amalgam) being maintained within the reaction zone and a portion of the non-amalgam phase containing the said metal salt in suspension being recycled to the reaction zone.

The process is especially applicable to the manufacture of adiponitrile by the hydrodimerisation of arcylonitrile. Other alpha-beta-mono-olefinic nitriles may be used as starting materials, including alkenyl nitriles containing up to 4 carbon atoms in the alkenyl group. Alpha-beta-mono-olefinic carboxylates which may be used as starting materials include esters of alpha-beta-mono-olefinic mono- or di-carboxylic acids with alkanols containing up to 4 carbon atoms, for example methyl acrylate and ethyl acryate.

The preferred amalgam is sodium or potassium amalgam, as these are readily available; other alkali-metal amalgams, and alkaline-earth metal amalgams may be used, however.

The proton source is preferably water although lower alcohols (for example methanol and ethanol) which do not themselves react with acrylonitrile to form undesired byproducts may be used; mixtures of water and alcohols may also be used.

The process is preferably carried out in the presence of a salt capable of forming alkylated cations in the non-amalgam phase; suitable salts are, for example, those described in the specification of Netherlands application No. 6504863. Thus the salt may form alkylated ammonium, phosphonium or sulphonium cations, for example tetra-alkyl ammonium ions, tetra-alkyl phosphonium ions, or tri-alkyl sulphonium ions. The preferred salts are tetra-alkyl ammonium salts and especially preferred are tetra-alkyl ammonium salts in which the N-atom is attached to 3 or 4 lower alkyl groups, for example groups containing from 1 to 4 (preferably 1 or 2) carbon atoms; thus tetra-ethyl ammonium salts and methyl triethyl ammonium salts are among the preferred salts. The salt may comprise the alkylated cation in association with a wide variety of anions; halides and p-toluene sulphonates are preferred on solubility grounds.

The polar organic solvent should be unreactive towards the other components of the non-amalgam phase and towards the amalgam. Suitable solvents include acetonitriles, dioxan, dimethylacetamide, dimethylformamide, dimethyl sulphoxide and tetrahydrofuran. The hydrodimer product (for example adiponitrile) may itself be regarded as a polar organic solvent and the hydrodimer content of the recycled mixture is to be taken into account in calculating the proportion of total polar organic solvent in the non-amalgam phase.

The salt forming alkylated cations preferably comprises at least 0.2 mole percent of the non-amalgam phase.

The non-amalgam phase preferably contains a proportion of the alpha-beta-mono-olefinic nitrile or carboxylate within the range 2.5 to 20 mole percent, a proportion of the proton source within the range 1 to 30 mole percent, preferably from 2 to 20 mole percent, and a proportion of salt forming alkylated cations within the range 0.2 to 8 mole percent, the remainder consisting essentially of polar organic solvent.

The proportions of the components of the non-amalgam phase are calculated excluding the metal salt suspended in the said phase.

The term "pH" as applied to the non-amalgam phase denotes the apparent pH measured using conventional instruments or indicators; the apparent pH may not have the same significance in terms of hydrogen ion concentration as in wholly aqueous systems but is a convenient measure of the degree of alkalinity of the non-amalgam phase.

The preferred acidic buffering agent is carbon dioxide, which dissolves in the non-amalgam phase to provide a well-distributed reserve of acid for the neutralisation of the alkalinity generated upon decomposition of the amalgam in the hydrodimerisation process. Other acidic buffering agents forming, with the metal of the amalgam, salts precipitated in the non-amalgam phase may also be used, for example phosphoric acid.

The hydrodimerisation reaction is conveniently carried out at substantially atmospheric pressure but a wide range of pressure and temperature may be used, depending upon the particular olefinic starting material and upon the solvent employed. In general, it is preferred to carry out the reaction at a temperature within the range from 10° C. to 55° C., a temperature range of from 30° C. to 45° C. being preferred. The reaction is exothermic and the reaction temperature may conveniently be controlled by adjusting the rate of introduction of reactants.

Intimate contact between the amalgam and the non-amalgam phase is desirable and this may be achieved using a reactor wherein the amalgam is dispersed throughout the non-amalgam phase by causing the non-amalgam phase to pass upwardly through a reaction zone into which fresh amalgam is continuously supplied. The reaction may be carried out, for example, in the apparatus described in Dutch application No. 6617641.

The rate of introduction of reactants is arranged so that substantially all the amalgam is decomposed in the reaction zone. The mercury formed (and any residual amalgam) is separated from the rest of the mixture leaving the reaction zone, for example by a cyclone separator. After removal of mercury, a portion of the non-amalgam phase (containing the metal salt in suspension) is withdrawn for separation of the metal salt and recovery of the hydrodimer product; the remainder of the suspension is re-cycled to the reaction zone.

The concentration of the suspension of the metal salt is preferably at least 0.5% by weight of the total weight of the suspended salt and the non-amalgam phase; a concentration of at least 2% by weight, for example 5% to 20%, is especially preferred. As the concentration is increased above about 40% it may become difficult to maintain circulation of the suspension.

The required concentration of the suspension is preferably achieved by recycling at least 1 part by weight of the non-amalgam phase for each part by weight of the non-amalgam phase removed for separation of the metal salt therefrom. It is especially preferred to recycle at least 5 parts by weight (for example from 10 to 100 parts) of the non-amalgam phase for each part removed. (The proportion of the non-amalgam phase to be recycled is calculated excluding the metal salt suspended in the said phase.)

The removed portion of the non-amalgam phase may be treated in a variety of ways to separate the metal salt and recover the hydrodimer product. Thus the metal salt may be removed, for example contrifugally or by filtration, and the hydrodimer subsequently recovered by distillation and/or solvent extraction. Depending upon the desired concentration of hydrodimer product in the non-amalgam phase, it may be necessary to recycle to the reaction zone a proportion of the non-amalgam phase from which the metal salt has been removed.

By hydrogenation of adiponitrile hexamethylenediamine is obtained. The latter is a valuable intermediate for the manufacture of synthetic linear polyamides (suitable for melt spinning into fibres) by polycondensation with dicarboxylic acids, especially adipic acid which gives polyhexamethylene adipamide (nylon 6,6).

The invention is illustrated but not limited by the following examples in which all parts, unless otherwise stated, are by weight.

EXAMPLE 1

FIG. 1 is a diagrammatic flowsheet of one embodiment of the invention. The mixing vessel 1 is continuously fed with acrylonitrile (5.2 parts/hour including recycled acrylonitrile) through line 2, with acetonitrile (37.5 parts/hour including recycled acetonitrile) through line 3, with a 41% w./w. solution of methyl triethyl ammonium chloride in water (5.8 parts/hour) through line 4, and with a recycled mixture of reaction products containing sodium bicarbonate in suspension (1600 parts/hour) through line 5. Carbon dioxide is introduced through line 14 to line 5. The resulting mixture flows through line 6 into the hydrodimerisation reactor 7 where it passes upwardly through a reaction zone into which sodium amalgam (650 parts/hour) is continuously fed through line 8. The sodium amalgam contains 2 parts sodium per 1002 parts total amalgam. The average residence time of the mixture in the reactor is 2 seconds. The rate of introduction of $CO_2$ is controlled to maintain an apparent pH in the reaction zone of 8.5. The heat evolved in the reaction is such that the temperature of the mixture of reaction products (containing sodium bicarbonate in suspension) is 40° C. The mixture is passed along line 9 to the cyclone separator 10 where entrained mercury is separated and removed through line 11. After removal of mercury, the mixture of reaction products (containing sodium bicarbonate in suspension) is passed along line 12 and is then split into two portions, 1600 parts/hour being returned along line 5 to the mixing vessel 1 and 52 parts/hour being bled-off through line 13 for separation of sodium bicarbonate and recovery of the product adiponitrile. The portion bled-off through line 13 is fed to a centrifuge where sodium bicarbonate is separated. The non-amalgam phase leaving the centrifuge is treated with water to give (a) an aqueous solution of methyl triethyl ammonium chloride which is recycled to the mixing vessel 1 through line 4 and (b) an organic portion comprising adiponitrile, acrylonitrile and acetonitrile, from which adiponitrile is recovered by distillation the acrylonitrile and acetonitrile being recycled to the mixing vessel 1 through lines 2 and 3 respectively.

On establishment of steady state conditions, the mixture passing along line 12 consists of 10 parts of sodium bicarbonate in suspension in 100 parts of non-amalgam phase, the non-amalgam phase comprising the following:

|  | Percent w./w. |
|---|---|
| Acetonitrile | 79.2 |
| Adiponitrile | 5.8 |
| Acrylonitrile | 5.0 |
| Methyl triethyl ammonium chloride | 5.0 |
| Water | 5.0 |

EXAMPLE 2

The apparatus described in Example 1 was operated with the same starting materials but under different conditions. The composition of the mixture passing along line 12 for four different cases is given in the following table:

|  | A | B | C | D |
|---|---|---|---|---|
| Parts of sodium bicarbonate in suspension by weight per 100 parts of non-amalgam phase | 19.6 | 26.3 | 6.3 | 12.2 |
| Non-amalgam phase composition, parts by weight per 100 parts by volume: |  |  |  |  |
| Adiponitrile | 16.4 | 16.8 | 18.6 | 7.4 |
| Acrylonitrile | 5.7 | 4.8 | 4.8 | 5.5 |
| Methyltriethylammonium chloride | 2.1 | 3.0 | 4.5 | 4.0 |
| Water | 5.7 | 3.3 | 3.9 | 3.9 |

EXAMPLE 3

The apparatus described in Example 1 was operated with the same starting materials except that tetraethylammonium chloride was used as the quaternary ammonium salt and under different conditions. The composition of the mixture passing along line 12 for three different cases is given in the following table:

| | A | B | C |
|---|---|---|---|
| Parts of sodium bicarbonate in suspension by weight per 100 parts of non-amalgam phase | 11.2 | 11.1 | 11.0 |
| Non-amalgam phase composition, parts by weight per 100 parts by volume: | | | |
| Adiponitrile | 6.9 | 6.9 | 7.4 |
| Acrylonitrile | 5.0 | 5.1 | 4.9 |
| Tetraethylammonium chloride | 2.7 | 3.8 | 3.3 |
| Water | 3.7 | 3.3 | 4.1 |

I claim:

1. In a continuous process for the reductive dimerization of acrylonitrile to prepare adiponitrile wherein a liquid reductive dimerization medium containing the acrylonitrile starting material and more than 50% by weight of an inert polar organic solvent is contacted at 10° C. to 55° C. in a reaction zone with an amalgam selected from the group consisting of alkali metal and alkaline earth metal amalgams, the measured pH is maintained in the range 7 to 11.5 by the addition of carbon dioxide whereupon a suspension of alkali metal or alkaline earth metal bicarbonate is formed in the reaction mixture by reaction between the carbon dioxide and the metal of the amalgam, reaction mixture is removed from said reaction zone, and the mercury formed and any residual amalgam are separated from the non-amalgam reaction product containing adiponitrile and said metal bicarbonate and adiponitrile is then recovered from the thus separated non-amalgam reaction product, the improvement which comprises dividing the non-amalgam reaction product, after said separating of mercury and any residual amalgam, into two portions, withdrawing one of said portions and recovering the metal bicarbonate and adiponitrile therefrom and recycling the other portion containing the bicarbonate in suspension to the reaction zone, said portions being such that at least one part by weight of the non-amalgam reaction product containing said metal bicarbonate is recycled for each part by weight which is withdrawn for recovery of said metal bicarbonate and adiponitrile, a concentration of at least 2% by weight of the metal bicarbonate being thereby maintained in suspension in said reaction zone.

2. The process of claim 1 in which the metal bicarbonate is removed from the portion of the non-amalgam reaction product withdrawn for the separation thereof by centrafuging, and the adiponitrile is separated from the resulting liquid phase by distillation.

3. The process of claim 1 in which the metal bicarbonate is removed from the portion of the non-amalgam reaction product withdrawn for the separation thereof, and a portion of the bicarbonate-free non-amalgam reaction product is recycled to the reaction zone.

4. The process of claim 1 in which the non-amalgam phase contains 0.2 mole percent of a salt capable of forming alkylated cations.

5. The process of claim 4 in which the salt capable of forming alkylated cations is a tetra-alkyl ammonium salt in which the N-atom is attached to at least three lower alkyl groups.

6. The process of claim 4 in which the non-amalgam phase contains a proportion of the said acrylonitrile within the range 2.5 to 20 mole percent, a proportion of a proton source within the range 1 to 30 mole percent and a proportion of the salt capable of forming alkylated cations within the range 0.2 to 8 mole percent, the remainder consisting essentially of inert polar organic solvent.

7. A continuous process according to claim 1 for the manufacture of adiponitrile from acrylonitrile which comprises reacting sodium amalgam in a reaction zone with a non-amalgam phase containing from 2.5 to 20 mole percent of water and from 0.2 to 8 mole percent of a tetra-alkyl ammonium salt in which the N-atom is attached to at least three lower alkyl groups, the remainder consisting essentially of inert polar organic solvent, at a measured pH which is maintained in the range 7 to 11.5 by addition of carbon dioxide, and at a temperature of from 30 to 45° C., the sodium bicarbonate formed by reaction of the carbon dioxide and the sodium remaining in suspension in the reaction mixture at a concentration of from 5 to 20% by weight, separating the mercury and any residual amalgam from the non-amalgam reaction product, withdrawing a portion of the non-amalgam reaction product containing the sodium bicarbonate in suspension, removing the sodium bicarbonate therefrom by centrifuging, and separating adiponitrile from the resulting liquid phase by distillation, and recycling the remainder of the non-amalgam reaction product to the reaction zone, from 10 to 100 parts of the non-amalgam reaction product being recycled for each part withdrawn.

References Cited

UNITED STATES PATENTS 3,462,478   8/1969   Fanshawe _____ 260—465.8

JOSEPH P. BRUST, Primary Examiner

U.S. Cl. X.R.

260—485